(12) United States Patent
Lopes

(10) Patent No.: US 9,073,701 B2
(45) Date of Patent: Jul. 7, 2015

(54) BULK MATERIAL RECLAIMER CONTROL SYSTEM

(71) Applicant: VALE S. A., Rio de Janeiro (BR)

(72) Inventor: Bruno Eduardo Lopes, Sao Luis (BR)

(73) Assignee: VALE S.A., Rio de Janeiro (BR)

( * ) Notice: Subject to any disclaimer, the term of this patent is extended or adjusted under 35 U.S.C. 154(b) by 16 days.

(21) Appl. No.: 13/908,532

(22) Filed: Jun. 3, 2013

(65) Prior Publication Data

US 2013/0341159 A1    Dec. 26, 2013

Related U.S. Application Data

(60) Provisional application No. 61/655,373, filed on Jun. 4, 2012.

(51) Int. Cl.
| | |
|---|---|
| A01D 41/00 | (2006.01) |
| B65G 43/00 | (2006.01) |
| B65G 17/12 | (2006.01) |
| E02F 3/18 | (2006.01) |
| G05B 13/04 | (2006.01) |
| G05B 13/02 | (2006.01) |
| G05D 7/00 | (2006.01) |
| E02F 9/26 | (2006.01) |

(52) U.S. Cl.
CPC ............... *B65G 43/00* (2013.01); *B65G 17/12* (2013.01); *E02F 3/181* (2013.01); *G05B 13/048* (2013.01); *G05B 13/0265* (2013.01); *G05D 7/00* (2013.01); *E02F 9/265* (2013.01)

(58) Field of Classification Search
USPC ................ 56/10.2 R, 10.2 D, 10.2 E, 10.2 G; 198/301, 507; 460/6
See application file for complete search history.

(56) References Cited

U.S. PATENT DOCUMENTS

| | | | | |
|---|---|---|---|---|
| 3,073,099 | A * | 1/1963 | Andersen .......................... | 460/6 |
| 3,470,681 | A * | 10/1969 | Saemann ......................... | 460/6 |
| 3,574,307 | A * | 4/1971 | Theobald .......................... | 460/4 |
| 4,073,377 | A * | 2/1978 | Stoessel et al. ............... | 198/624 |
| 4,090,601 | A * | 5/1978 | Freed, Jr. .................... | 198/316.1 |
| 4,130,980 | A * | 12/1978 | Fardal et al. ................ | 56/10.2 F |
| 4,337,611 | A * | 7/1982 | Mailander et al. ................ | 460/7 |
| 4,487,002 | A * | 12/1984 | Kruse et al. ........................ | 460/6 |
| 4,890,719 | A * | 1/1990 | Yagi et al. ...................... | 198/507 |
| 5,633,452 | A * | 5/1997 | Bebernes .......................... | 73/37 |
| 5,988,936 | A * | 11/1999 | Smith .......................... | 404/84.2 |
| 6,052,978 | A * | 4/2000 | Kempf ............................. | 56/119 |
| 6,336,684 | B1 * | 1/2002 | Turner ........................... | 299/1.9 |
| 6,475,081 | B2 * | 11/2002 | Coers et al. ........................ | 460/7 |
| 6,591,145 | B1 * | 7/2003 | Hoskinson et al. ............. | 700/28 |
| 6,863,604 | B2 * | 3/2005 | Behnke ............................. | 460/6 |
| 6,874,304 | B2 * | 4/2005 | Clauss ........................ | 56/10.2 R |
| 6,899,616 | B1 * | 5/2005 | Murray et al. .................... | 460/6 |
| 6,951,230 | B1 * | 10/2005 | Wegman ...................... | 141/256 |
| 7,478,518 | B2 * | 1/2009 | Kraus et al. ................ | 56/10.2 R |
| 8,056,309 | B2 * | 11/2011 | Vandendriessche ....... | 56/16.4 B |
| 8,684,291 | B2 * | 4/2014 | Galloway et al. .............. | 241/34 |

* cited by examiner

*Primary Examiner* — Douglas Hess
(74) *Attorney, Agent, or Firm* — Arent Fox LLP

(57) ABSTRACT

The present invention refers to a control system for bulk material reclaimers that comprises an automated control of turning speed and translation step variables, the turning speed being controlled by estimating the reclaiming flow and the translation step being adjusted in function of distance.

10 Claims, 20 Drawing Sheets

BULK MATERIAL RECLAIMER CONTROL SYSTEM

CROSS-REFERENCE TO RELATED APPLICATION

This application is based upon and claims the benefit of priority of U.S. Patent Application No. 61/655,373, filed Jun. 4, 2012, the disclosure of the prior application is hereby incorporated in its entirety by reference

FIELD OF THE INVENTION

The present invention refers to a control system for bulk material reclaimers and, more specifically, to a control and optimizing system for stack-piled ore reclaimers.

FUNDAMENTALS OF THE INVENTION

The need for controlling systems and physical processes exists since ancient times. The manual control, the first kind of control used by man, and still present in many processes, requires a human operator who must know the system and be reasonably experienced and skilled. As the human activity sophistication degree increases, it has become interesting as well as necessary to fully or partially automatize certain processes, it was possible as a result of scientific and technological development, which among miscellaneous knowledge, has brought us the classical control theories.

However, as technology advances, systems and processes have become even more complex, thus rendering ineffective or even impossible to use conventional controllers based on the classical theory. This has unleashed a search for new control methods and strategies, such as: multivariable control, adaptive control, predictive control, and smart control systems.

There is a specific control problem associated with reclaimer automation, especially regarding those devices used for recovering ore on mining plants. Among the inconveniences of automated reclaimer operation systems, we can mention the occurrence of overflowing and the variability in the reclaiming flow.

Among the reclaimer operating modes known, there is the so-called semi-automatic operation. In this mode, the operator takes part both in the reclaimer setup as well as in the operation itself, considering the following steps:

a) For the reclaimer operation setup or start-up:
The operator positions the reclaimer onto a countertop;
Defines which turning direction will be taken;
Defines the translation step amount;
Starts the semi-automatic reclaiming; and
Marks the initial and final turning angles.
b) During the operation itself:
The operator adjusts the translation step;
He adjusts the initial and final turning angles;
He remotely monitors the operation.

One of the major difficulties associated with the reclaimer flow control is the longer time between the bucket wheel, which receives and dumps the load and the flow detector—usually scales—installed downstream from the reclaimer.

Such delay, which can be higher than 10 seconds, makes control instable and places the responsibility for the reclaiming operation result onto the reclaimer operator's shoulders.

A second difficulty is associated with the turning speed adjustment and the translation step adjustment.

On already known semi-automatic systems, the step control is manually performed by the operator. If the step amount is shorter, the reclaimer will not achieve the expected flow. If the step amount is larger, overflowing will be noticed. Additionally, since the adjustment is manual and individual, the stack format greatly influences the reclaiming performance.

A third difficulty lies in the loss of the reclaiming rate noticed when the reclaimer performs the translation step process. In fact, on existing systems, it can be noticed that at each translation step, a significant loss in the reclaiming rate occurs, mainly due to the fact that the turning and the translation step movements are not simultaneously performed.

Besides the above-mentioned difficulties, another challenge associated with the reclaimer operation is the so-called "attack" to the bulk material piles (for example, ore stockpiles). In order to enable the reclaimer to effectively control the reclaiming flow, it is necessary that throughout the entire reclaiming process, the system knows the main features of the shelf that is being reclaimed at that moment: Countertop height; Bucket wheel penetration distance; and information about the pile edge. The incorrect assessment of such information may lead to a collision against the pile, and its material consequently collapsing.

Finally, the reclaimer operation on a stockyard may be subject to additional inconveniences if the control system does not have information about the reclaimer position, since accidents and collisions with other machines may occur.

SUMMARY OF THE INVENTION

Therefore, one of the objectives of the present invention is providing a reclaimer control system, which is capable of optimizing the reclaimer operation.

It is also an objective of the present invention to provide a reclaimer control system, which eliminates some of the following manual steps performed by the operator during the setup and the reclaiming operation: defining the turning direction, defining the translation step amount, marking initial and final turning angles, adjusting the translation step amount during operation, and adjusting the initial and final turning angles during the operation.

Another objective of the present invention is providing a reclaimer control system, which is capable of providing correct information about the reclaimer position along the stockyard, helping the reclaimer during the translation step and providing more reliability to the machine anti-collision system.

Further objective of the prevent invention is providing a reclaimer control system, which is capable of improving the performance during the attack to the pile, controlling collapsing information, and controlling countertop information, such as height and penetration.

The present invention achieves the above-referred objectives by means of a control system comprising:
Developing an estimated flow based on the bucket wheel pressure or electric current.
Using a PID controller for controlling the reclaiming flow based on the turning speed.
Reducing losses at the countertop edges employing simultaneous step and turning process.
Controlling the translation step based on the ideal turning speed.

Therefore, identification techniques have been employed for enabling flow modeling based on the bucket wheel pressure or electric current:
Using the Extended Least Square Method for successfully representing the flow on the Bucket Wheel itself, thus eliminating the delay time;

Reinforcement Learning techniques have been used so that the Flow

Estimator is corrected as time passes, using actual samples;

Developing logic for tuning the step amount with the ideal turning speed, reducing the variability and increasing the mean flow at each turning.

Configuring and tuning the PID controller for controlling the reclaiming flow based on the turning speed.

The present invention system also comprises the installation of two IDDR sensors for controlling the attack to the pile. Therefore, the system is capable of identifying:

Controlling pile countertop information;

Countertop height;

Bucket wheel penetration distance inside the pile;

Countertop surface format; and

Initial and final turning angles.

The countertop information can be used for calculating the ideal turning speed during reclaiming in order to keep the flow equal to the expected value.

The present invention system also comprises the use of IATR sensors for controlling the reclaimer position along the stockyard. Therefore, on the present invention system, sensors are used for controlling the reclaimer translation step based on distance (for example, in centimeters).

The physical portion of the present invention system preferably comprises:

Two Radar scanners for attacking and positioning the machine on the pile;

Three Radar transponders for the reclaimer positioning system.

SUMMARIZED DRAWING DESCRIPTION

FIG. 1—illustrates the delay between bucket wheel and the scale;

FIG. 2—illustrates electric current data used for estimating model parameters;

FIG. 3—illustrates flow data used for estimating model parameters;

FIG. 4—illustrates electric current data for validating model #1;

FIG. 5—illustrates a comparison between actual and estimated flow;

FIG. 6—illustrates a comparison between estimated and actual flow;

FIG. 7—shows a comparison between the actual and the estimated flow;

FIG. 8—shows a comparison between actual and estimated flow;

FIG. 9—shows a comparison between actual and estimated flow;

FIG. 10—shows a flow control loop;

FIG. 11—illustrates a controlled flow at 8000 ton/hr;

FIG. 12—illustrates time on each turning direction before implementing the translation step control;

FIG. 13—illustrates time on each turning direction before implementing the translation step control;

FIG. 14—illustrates a variability evolution of RP-313K-03;

FIG. 15—illustrates a flow evolution of RP-313K-03;

FIG. 16—illustrates an overflow evolution of RP-313K-03;

FIG. 17—illustrates a variability evolution of ER-313K-04;

FIG. 18—illustrates a flow evolution of ER-313K-04;

FIG. 19—illustrates an overflow evolution of ER-313K-04;

FIG. 20—shows action ranges for each controller;

FIG. 21—shows a daily productivity, comparison between before and after the reclaimer optimization object of this invention;

FIG. 22—shows a daily variability, comparison between before and after the reclaimer optimization object of this invention;

FIG. 23—shows an overflow follow-up during 5-hours operation;

FIG. 24—illustrates an IDRR sensor interconnecting diagram;

FIG. 25—illustrates an IATR sensor interconnecting diagram;

FIG. 26—shows an antenna installed at the TR-313k-18 transfer room;

FIG. 27—shows an antenna installed at the ER-313k-03 front portion;

FIG. 28—shows an antenna installed at the ER-313k-03 rear portion;

FIG. 29—shows an antenna installed at the ER-313k-04 front portion;

FIG. 30—illustrates an installation of sensors IDRR 1 and 2;

FIG. 31—shows the calibration of "0" value for IDRR reading zones;

FIG. 32—shows a methodology used for defining the bucket wheel penetration on value into the pile;

FIG. 33—shows a methodology used for defining the countertop height;

FIG. 34—shows left-hand edge detection;

FIG. 35—illustrates a comparison between the actual flow and the predicted flow; and FIG. 36—illustrates a comparison between the actual flow and the 18-seconds delayed predicted flow.

DETAILED DESCRIPTION OF THE INVENTION

The present invention will be further described in detail based on the execution example shown on the drawings.

A first aspect of the present invention is related to a logic pattern for optimizing the flow, which has been developed in order to control the following variables:

Turning speed

Translation step

Turning Speed Control

Mathematical Data Modeling

Due to the high delay time of the bucket wheel regarding the process scales (see FIG. 1), which would not make it possible to implant the flow control; it was necessary to develop a mathematical model for estimating the reclaiming flow and eliminating such delay time.

Initially, flow correlation has been studied with the following process variables:

Bucket wheel electric current or pressure

Turning motor electric current

Turning speed

It has been noticed that the existence of a high correlation between the reclaiming flow regarding the bucket wheel electric current or pressure and regarding the turning speed, and the low correlation regarding the Turning electric current. For such development, it has been noticed that the need of only using the bucket wheel current or pressure for estimating the reclaiming flow.

For a mathematical representation of the estimated reclaiming flow, the ARX linear model and the Extended Least Square Method have been used for estimating parameters. For defining the model order, the Autovalue Analysis Method for linear models was used.

In order to estimate the ARX model parameters, exemplifying data shown on FIG. 2 (Electric current) and FIG. 3 (Flow) were used.

The $3^{rd}$ order model obtained was:

$$y(k)=a1*y(k-3)-a2*y(k-2)+a3*y(k-1)+a4*u(k-2)-a5*u(k-1)+a6*u(k))  \quad \text{(model \#1)}$$

where y=estimated flow, u=Bucket wheel electric current or pressure and a1, a2, a3, a4, a5 e a6 are the parameters of the discrete system to be estimated.

For the validation of the model #1 above, the electric current data shown on FIG. 4 were used. The actual flow and the estimated flow for the electric current data shown on FIG. 4 are shown on FIG. 5. It can be noticed that the estimated model features a good representation of actual data (exemplifying data).

Reinforcement Learning

Due to a change in the behavior of the correlation between the Bucket Wheel and the reclaiming flow along time, model #1 began not properly estimating the flow. The problem was noticed some weeks after the model was implanted in the PLC.

In order to solve this problem, two new reinforcement learning methods have been created, called Difference Reinforcement Learning Method and Proportional Reinforcement Learning Method. The procedure for employing such methods is:

a. Graphically analyze the actual data behavior comparing to estimated data. Divide the graph into two or more areas, and such areas shall be divided according to a behavior change in the difference noticed between actual data and the estimated data. This graph was divided into 3 areas: Area #1: Flow<4000 ton/hr; Area #2: Flow>=4000 ton/hr and <=8000 ton/hr; Area #3: Flow>8000 ton/hr.

b. If the noticed difference between actual data and the estimated one refers to a stationary error, choose the Difference Reinforcement Learning Method. Should it be a proportionality error, use the Proportional Reinforcement Learning Method.

c. If the Difference Reinforcement Learning Method is chosen, compare the delayed estimated data (according to the delay time amount) with the actual data, calculate the difference between such data (Actual data−Delayed Estimated data) and add this difference to the estimated data. Such difference shall be calculated and added independently for each area defined in item "a" above.

d. If the Proportional Reinforcement Learning Method is chosen, compare the delayed estimated data (according to the delay time amount) with the actual data, divide one by the other (Actual data/Delayed Estimated data) and multiply the result found by the estimated data. Such division shall be calculated independently for each area defined on item "a" above.

e. The error calculation between actual and estimated data shall be done at every N seconds, while the N value will be defined according to the problem to be solved, for example, N=10 seconds.

Model #1 and the reinforcement learning method was configured on the reclaimer PLC and, on FIG. 6, it can be checked that the estimated flow features a good representation of the actual flow (exemplifying data).

By using the difference reinforcement learning method on reclaimers and Stacker-Reclaimers, it was possible to assure the estimated flow accuracy regardless of the behavior difference of the bucket wheel electric current or pressure along time. Such accuracy can be confirmed on FIG. 7, FIG. 8 and FIG. 9 that during the test period featured an estimated flow close to the actual flow, keeping the delay time amount.

PID Control

The turning speed interferes on the bucket wheel penetration intensity into the pile, and it is defined by means of a PID (Proportional Integral derivative) control loop which set point (SP) is the expected reclaiming flow (flow) and process variables (PV) the estimated flow through the bucket wheel electric current. The controlled variable (CV) is the boom turning speed. Such control loop can be confirmed on FIG. 10.

Since the PID tuning method was not a study object for this invention, a practical tuning method was used and the parameters found were: kp Gain=0.3; ki Gain=0.2; Sampling Period=100 milliseconds (exemplifying data).

The PID and the parameters found here were implemented in the reclaimer PLC (Programmable Logic Controller) and the result is shown on FIG. 11, where the operator established 8000 ton/hr as Set Point, and the PID controller adjusted the turning speed until the expected flow is reached. For such PID a 500 ton/hr Dead Band has been configured.

Translation Step

The initial translation step is manually defined by the operator and individually before each turning direction (clockwise and counterclockwise). Its adjustment is done in function of translation time or distance in seconds or centimeters.

Should the operator decide for the translation step automatic control, the ideal step is calculated in function of the average turning speed that the reclaimer had for reaching the flow Set Point value during a turning direction. If the average turning speed for reaching the expected flow is too high, the translation step time or distance is increased, if it is too low, the translation step time or distance is reduced.

The larger the translation step the slower the turning speed required for the reclaimer reaching the set point and the smaller the possibility of overflows and overloads occurring on the bucket wheel. The smaller the translation step, the faster the turning speed required for reaching the set point causing bigger losses due to the turning direction change. The idea is adjusting the translation step so that the expected flow is reached at a certain ideal speed for each turning direction.

The logic for the translation step control was configured in the reclaimer PLC and the result is shown on FIGS. 12 and 13. Before implementing the translation step control, the turning at each direction, on the base layer, lasted over 2 minutes, as shown on FIG. 12. After implementing the translation step control, the turning at each direction, on the base layer then featured an average 5-minute duration, FIG. 13, thus reducing losses due to turning direction change and increasing productivity.

Tests

The purpose of the invention for optimizing the flow control on Reclaimers is increasing productivity, reducing variability and overflows.

The variability of coefficient of variation (Cv) is calculated by dividing the standard deviation ($\sigma$) by the flow mean ($\mu$):

$$Cv=\sigma/\mu \quad (2)$$

On the example chosen, an overflow is considered when a reclaiming flow higher than 10000 ton/hr occurs during a period equal to or greater than 5 seconds.

We are going to show the results achieved when implementing the first version of the flow control optimization project at Reclaimer model RP-313K-03 and Stacker-Reclaimer model ER-313K-04. The same work was replicated to all Reclaimers and Stacker-Reclaimers, and similar results were achieved.

Model RP-313K-03:

On FIGS. 14, 15 and 16, it was possible to notice that after implementing the flow control optimization work at RP-313K-03 it was possible to achieve an average increase worth 5% in productivity with an average 10% reduction in variability and 20% reduction in overflow occurrence.

Model ER-313K-04

For ER-313K-04, the result was even better because as shown on FIGS. 17, 18 and 19, there was an average 9% increase in productivity with average 20% reduction in variability and 39% in overflow occurrence.

Additional Solutions for Optimizing Reclaimer Automation

The above-described logic pattern provides a good performance to the remote operation on semi-automatic mode; however, some factors such as initial and final turning angle, translation step and bigger flow control on unstable countertops need to be improved and, therefore, it is necessary to invest in new sensors. Such new sensors must secure:

Correct information about the reclaimer position along the stockyard, for assisting the reclaimer during the translation step and providing more reliability to the machine anti-collision system.

Good performance while attacking a pile and reclaiming a countertop (Avoiding collision against the pile, controlling collapsing information, controlling countertop information such as height, penetration, and ideal angle control for turning direction change).

Translation Step in Function of Distance

One of the biggest problems that were faced in the prior art was that the translation step was defined in function of time. An adjusted time amount not always makes the translation step to travel along the same distance during the translation, so that the bucket wheel might move far away or closer than it should, regarding the pile. Therefore, in the present invention the translation step is adjusted in function of distance or the time. For doing so, an IATR sensor was purchased, for taking the measurements, in centimeters, during the translation step.

IATR sensor is na instrument that informs the position of the reclaimer in the yard. In this case, any kind of sensor that is able to provide the same kind of information can be used (Encoder, GPS, Laser, etc.).

Attack to the Pile

In order to enable the reclaimer to effectively control the reclaiming flow, it is necessary that during the entire reclaiming process, the installed instrumentation informs the system about the main features of the countertop being reclaimed at that moment, such as:

Countertop height

Bucket wheel penetration distance inside the pile

Countertop surface format for collapsing control

Initial and final turning angles (Pile edge detection)

Using this information together with the turning speed value, it is possible to develop an estimator that can anticipate how the flow will be, either during a countertop reclaiming (predicted flow) and thus developing a predictive control preventing overflows from occurring, and improving the PID controller response time. Using the predicted flow formula, it will be possible to calculate the ideal turning speed during the entire countertop in order to maintain the reclaiming flow equal to the expected value.

The instrument chosen for returning the countertop information was the IDRR. With these information it is possible to predict the reclaiming flow and install the predictive control. This sensor is provided by Indurad Company and it is suitable to work in aggressive environment.

Predictive Control

In order to develop the predictive control, iDRR sensors were installed on the left-hand and on the right-hand sides of the bucket wheel. Such sensors inform the system about the bucket wheel penetration distance inside the pile and the pile area height that is being reclaimed. By using such information together with the turning speed, it was possible to develop an estimator for predicting the flow. A logic that checks the predicted flow value was developed, and if it is greater or lower than 15% of the expected flow, a predictive control action is performed, that is, the PID flow controller is temporarily deactivated, the ideal speed reference calculated by the predictive control is written on the PLC and then the PID controller is enabled again. It is important to point out that the PID controls the flow that was estimated by the bucket wheel electric current or pressure. The working area of each controller is shown on FIG. 20.

Predictive Control Details

For the predictive flow control, a flow estimator was developed using the bucket wheel penetration distance information towards the pile, countertop height, and the turning speed as parameters to such estimator.

FIGS. 35 and 36 show the estimator result (predicted flow). One can check that the anticipated flow features a good representation of the actual flow and its delivery time is 18 seconds. As the scale is 12 seconds delayed from the bucket wheel, one can conclude that by using the information made available by the IDDR sensors, it is possible to make a flow prediction 6 seconds ahead from the bucket wheel.

By using the predicted flow expression, it was possible to calculate the ideal turning speed throughout the entire reclaiming countertop in order to maintain the reclaiming flow equal to the expected value. Models (1) and (2) show the ideal speed formula for the clockwise and counterclockwise turning, respectively.

$$V1 = a1*SP + a2*P1 \tag{1}$$

$$V2 = b1*SP + b2*P2 \tag{2}$$

where V1=Counterclockwise Speed, V2=Clockwise Speed, P1=iDRR1 Penetration Value, P2=iDRR2 Penetration Value, SP=Flow Set Point and a1, a2, b1 e b2 are the parameters of the discrete system to be estimated.

In order to keep the reclaiming flow equal to the expected value, logic was developed for checking the predicted flow value using the information provided by the IDRR. Should it be greater or lower than 15% of the expected flow, and anticipating control is performed, that is, the PID flow controller is temporarily deactivated, the ideal speed reference is written in the PLC, and the PID controller is reactivated after a certain period.

Test

After implementing the new optimization logic, the reclaimer model ER-313k-03 began featuring greater reclaiming flow constancy; therefore it was possible to reduce the variability, thus achieving productivity increase.

In order to check the ER-313k-03 performance after implementing the reclaimer optimization project, PIMS data were used for calculating the daily productivity and variability values of the ER-313k-03 reclaimer. FIG. 21 and FIG. 22 show the results of such comparison. It is possible to confirm that after implementing the present invention, there has been an average 8% improvement in productivity with an 8% reduction in variability.

Regarding the overflow result, it was possible to confirm that, by means of the PIMS-extracted data, after implementing the present invention, the ER-313k-03 reclaimer is succeeding in maintaining a high productivity value with low overflow rate. On FIG. 23, it is possible to confirm that after implementing the invention, it was possible to reduce an average 30% amount on the overflow value.

On the invention preferred arrangement for developing the optimization project, it was necessary to acquire Indurad's IDRR and IATR instruments together with the installation and configuration services for such instruments.

Equipment used:
Field Installation Materials
2 IDRR sensors
1 IRPU for controlling the IDRR sensors
8 IATR antennas
1 IRPU for controlling the IATR sensors
CanBUS and Ethernet cables The instrumentation used by the present invention system shall assure:
- a) Turning angle accuracy
- b) Elevation angle accuracy
- c) Reclaimer position along the stockyard
- d) Good performance during the attack to the pile (Avoiding collision against the pile, controlling collapsing information, controlling ideal angles for turning direction change).

a) Turning Angle Accuracy

The solution is to install a Radio Frequency Identification—RFID system. The radio and the antenna shall be attached to a support on the turning rotary portion, and the TAGs shall be attached to the fixed area of the machine turning portion, at every 5 degrees a TAG shall be attached to secure the correct position of the machine.

The operation shall be done together with the encoder, that is, the RFID will indicate the defined angles and the encoder will make the reading between the RFID-defined angles. The RFID will also be responsible for presetting the encoder, that is, the encoder will be adjusted to each TAG. The 0° position is defined with the machine boom positioned over the stockyard TR on the flow direction: to the right-hand side, the angle indication varies positively, while to the left-hand side, it varies negatively.

b) Elevation Angle Accuracy

The solution is to install an electronic inclinometer for measuring the elevation, indicating angles according to the boom position. The 0° position is defined with the machine boom positioned horizontally; if the boom is moved upwards, the angle indication will vary positively, when the boom moves downwards, it will vary negatively.

c) Reclaimer Position Along the Stockyard

The suggested solution for the reclaimer positioning along the stockyard consists in installing three Radar transponders; one transponder shall be installed in the machine and the other two transponders shall be installed in the stockyard ends (initial and final).

Radar transponders assure communication in an extremely reliable way at distances up to 1800 meters and small obstacles do not cause signal losses. Their accuracy is in centimeters and the response time is below 1 second. Transponders are prepared for withstanding extremely aggressive environments, such as dust, high temperatures and storms.

d) Attack to the Pile

The machine positioning on the pile shall be done automatically, therefore the operator shall only inform the data of the pile to be reclaimed. During the entire reclaiming process, the instrumentation installed in the reclaimer shall control the main features of the pile, such as height, length and width. Such instrumentation shall control collapsing information and the ideal angles for changing the turning direction and it shall constitute a protection for preventing reclaimer collisions against the pile.

In order to control the reclaimer positioning on the pile, at least two 3D Radar scanners shall be installed.

The instrumentation shall meet the following requirements (preferred arrangement):

| Criterion | Requirement |
| --- | --- |
| Maintenance | Low maintenance need |
| Particulate material in suspension | Signal must not be reflected |
| Precipitation | Signal must not be attenuated |
| Response time | Lower than 100 ms |
| Obstruction | Must have low Sensitivity |
| Resolution | Lower than 10 cm |
| Protection Degree | IP65 or higher |
| Reading area | Installed at a 30-meter distance, it must have an area greater than 24 m$^2$ (2 m-long × 12 m-high) for performing a countertop reading |

Additional Features of the Preferred Installation

As previously described, Indurad's iATR and iDRR instruments have been identified as the best option for implementing the present invention system. Therefore, the proposed system consists of:

Two iDRR Radar scanners used for controlling the attack to the pile during the reclaiming process. These Radar Scanners are connected to an iRPU via CanBus and the iRPU will communicate with the PLC via Ethernet Modbus. The interconnecting diagram is shown in FIG. 24.

Four iATR sensors using 8 antennas for the ER-313k-03 positioning system along the stockyard and for calculating the anti-collision with ER-313k-04. The interconnecting diagram is shown in FIG. 25.

Instrumentation Installation iATR

The iATR system has been designed for measuring the distance between the TR-313k-18 transfer room and the ER-313k-03, and between the ER-313k-03 and the ER-313k-04. Each iATR module has been connected to two antennas in order to provide system redundancy, increasing sensor reliability and improving its accuracy at long distances. Distance calculation between antennas is performed by the iRPU installed in the ER-313k-03 and sent to the PLC, which will use such information for the automation logic.

The iATR model installed on the ER-313k-03 was the Master; it sends data received by the antennas to an iRPU located inside the electric room via Ethernet network cable. On the electric room, a second panel containing the power source and the switch responsible for interconnecting the iRPU with the PLC was installed.

IDRR

The iDRR installations were designed for controlling the pile countertop information. Therefore, two iDRR radars were installed, one on each side of the bucket wheel. These radars send data to an iRPU located inside the operator's cabin, which processes data and send it to the PLC.

Figure 1:
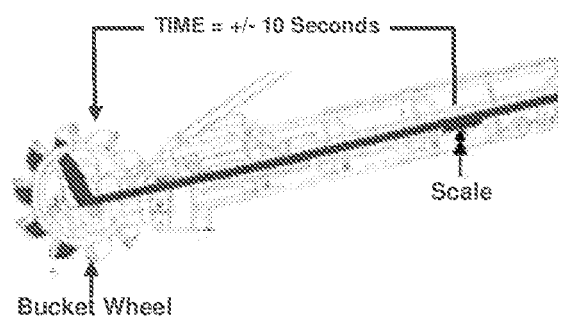
Figure 2:
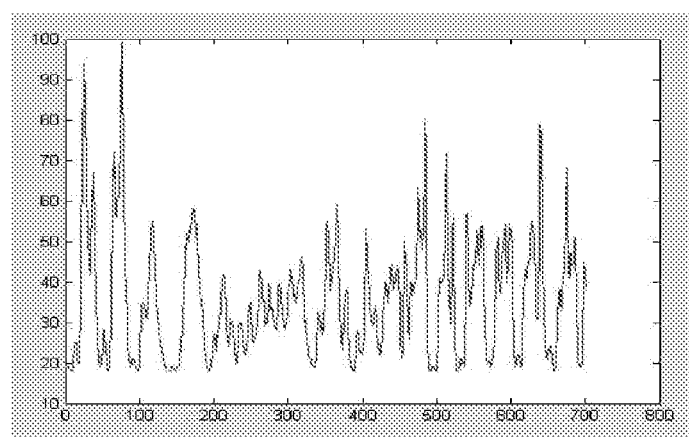
Figure 3:
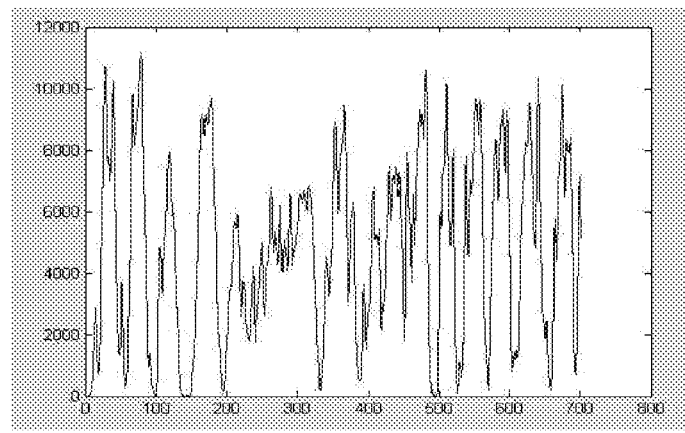
Figure 4:
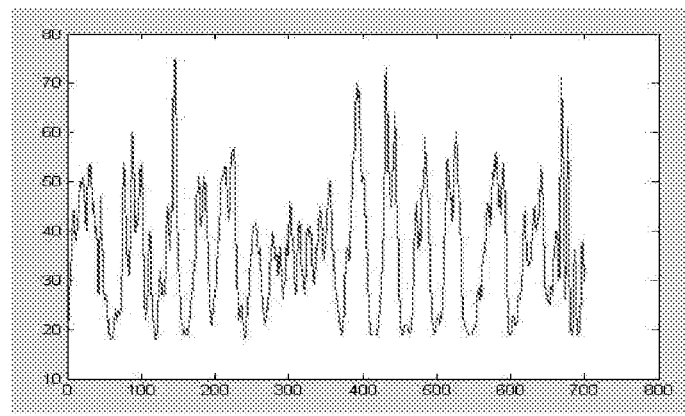
Figure 5:
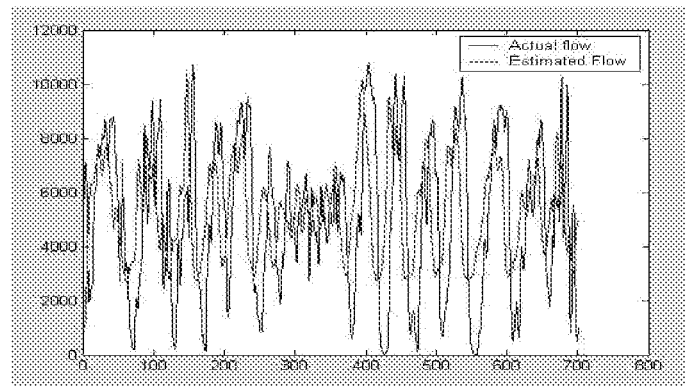
Figure 6:
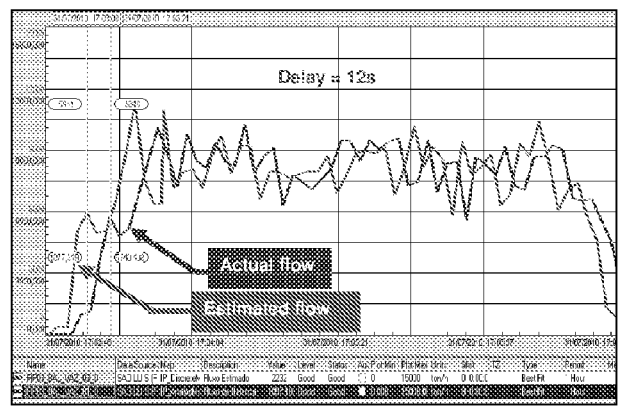
Figure 7:
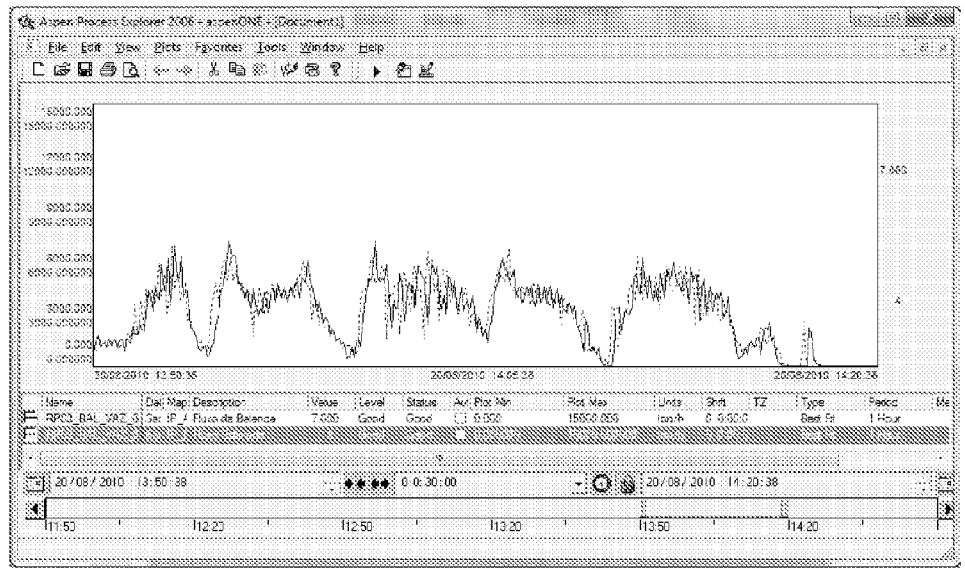
Figure 8:
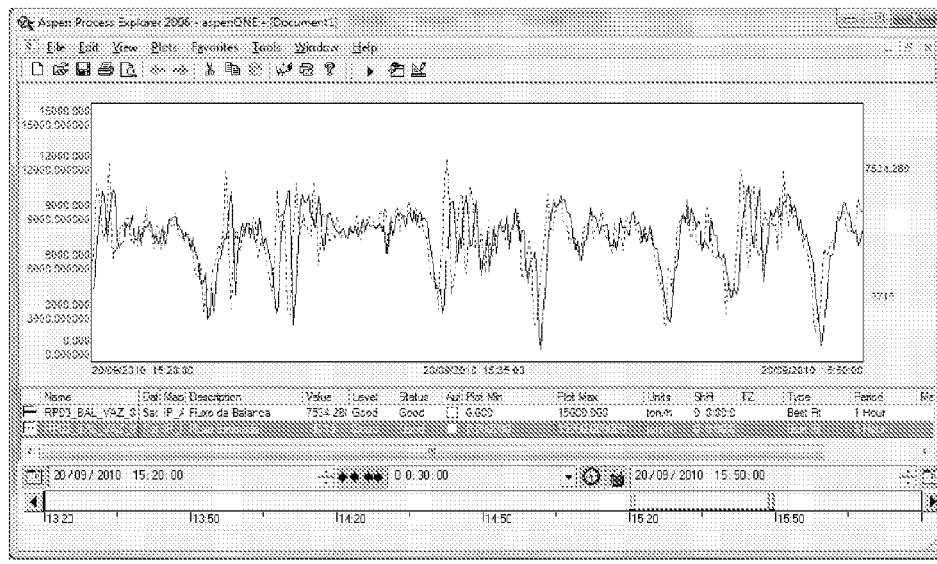
Figure 9:
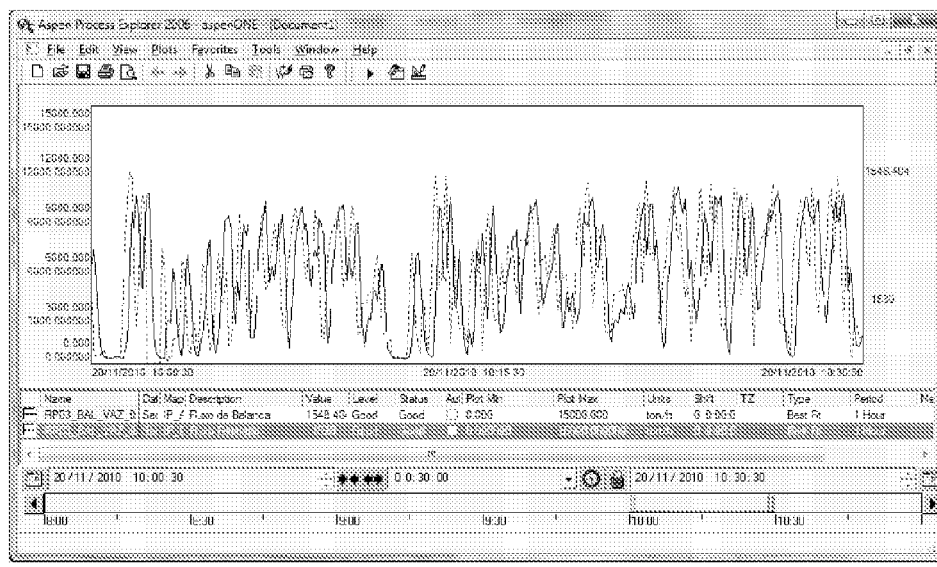
Figure 10:
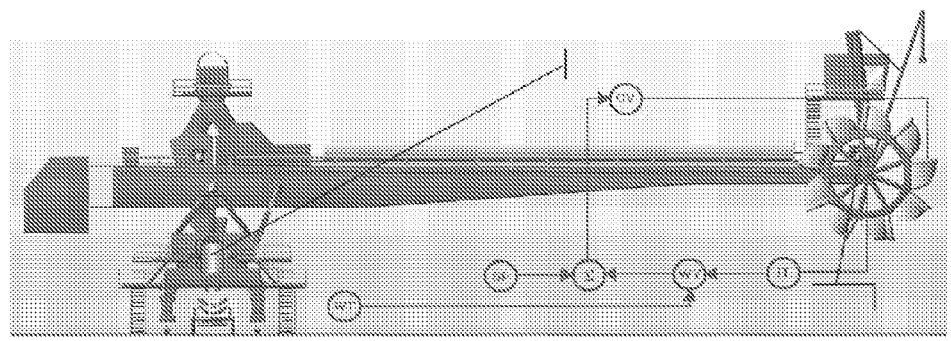
Figure 11:
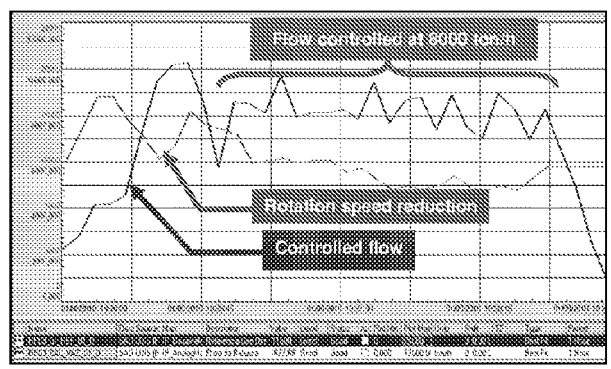
Figure 12:
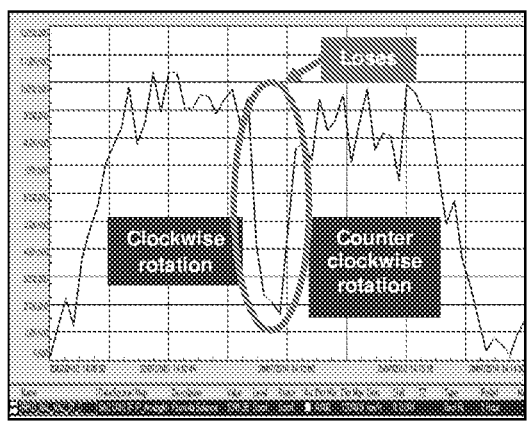
Figure 13:
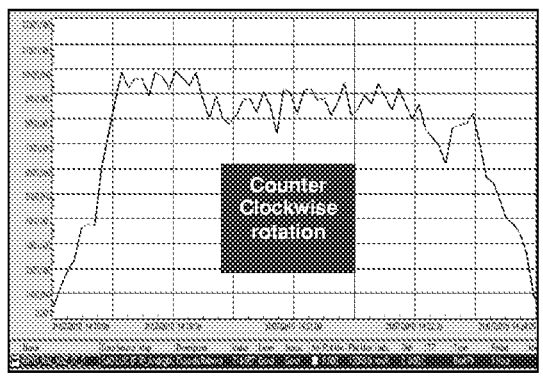
Figure 14:
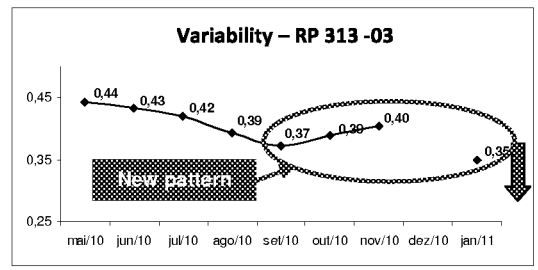
Figure 15:
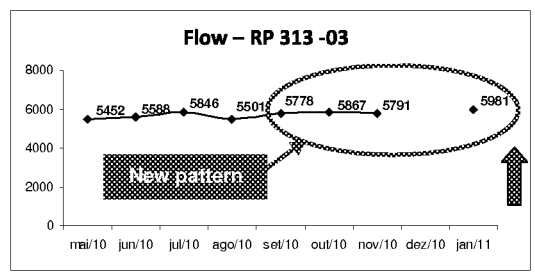
Figure 16:
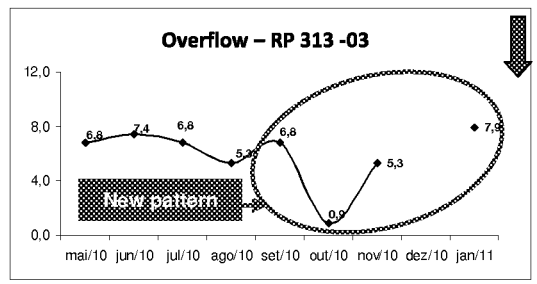
Figure 17:
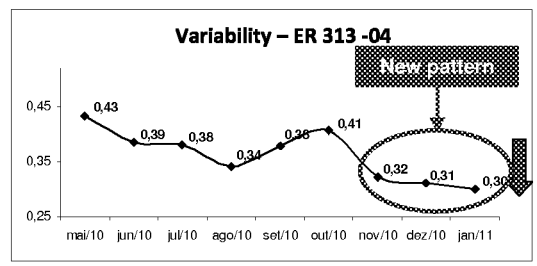
Figure 18:
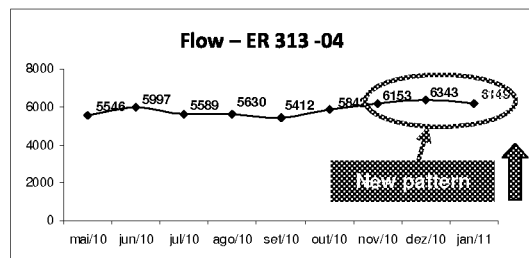
Figure 19:
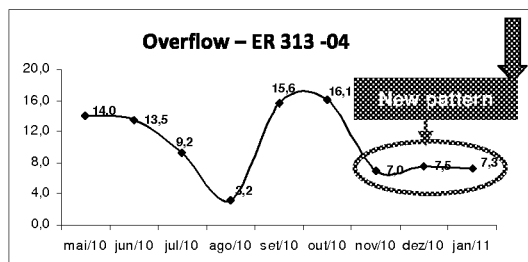
Figure 20:
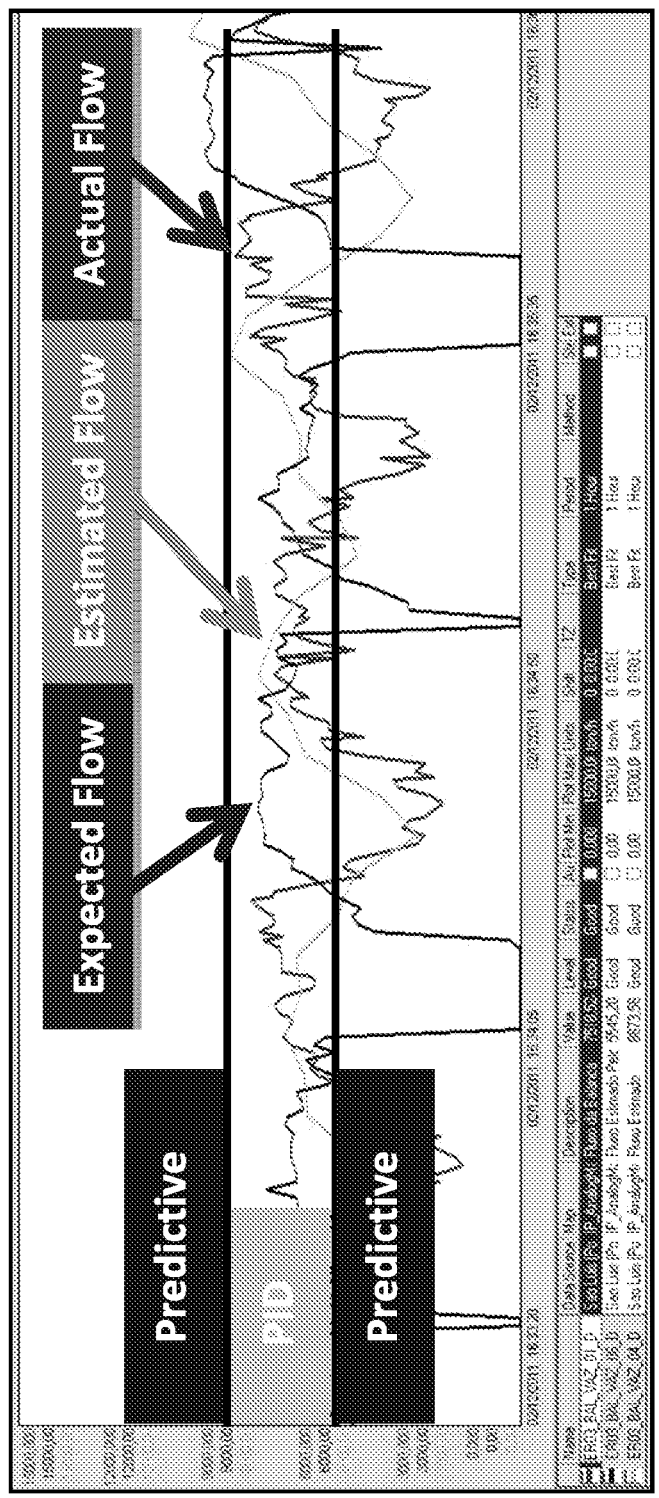
Figure 21:
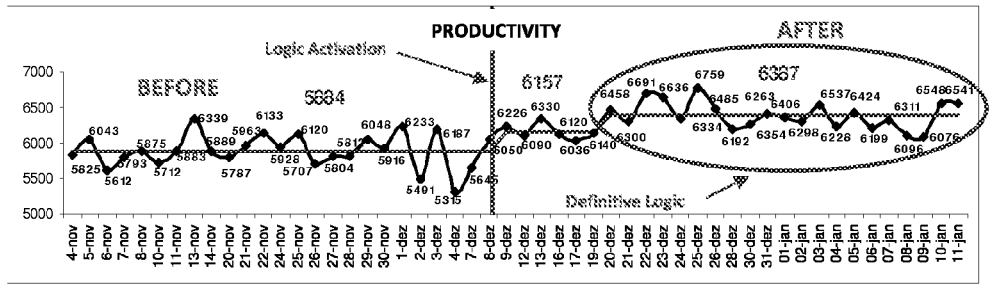
Figure 22:
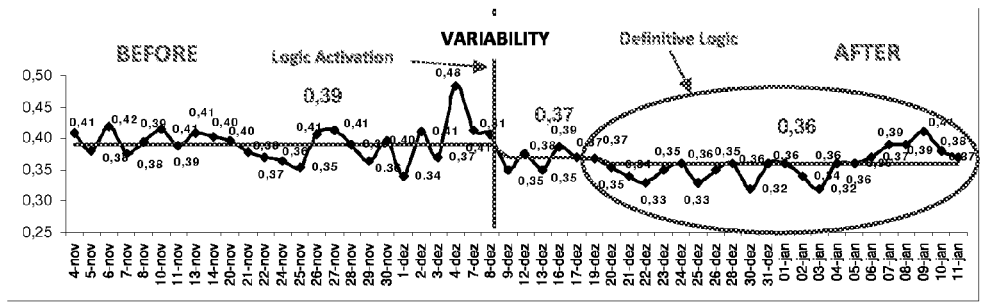
Figure 23:
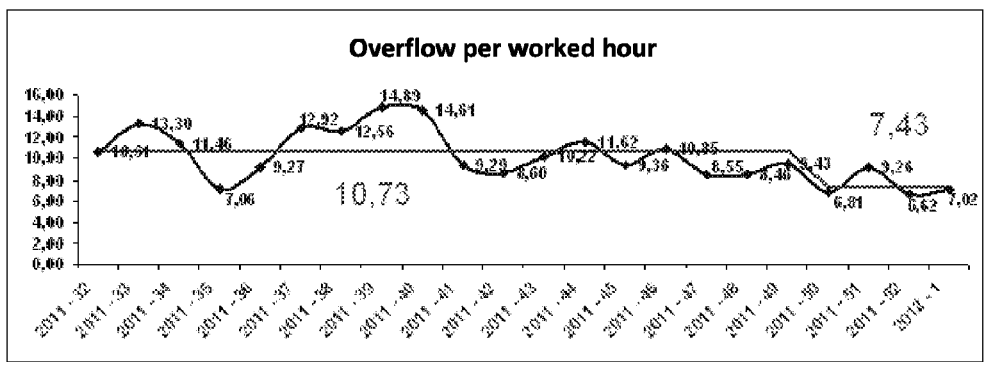
Figure 24:
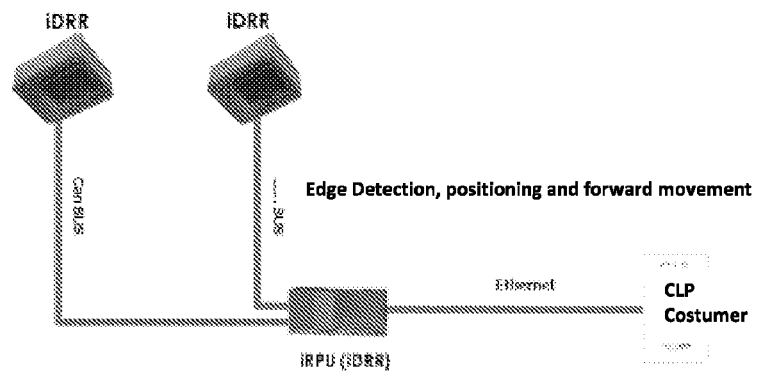
Figure 25:
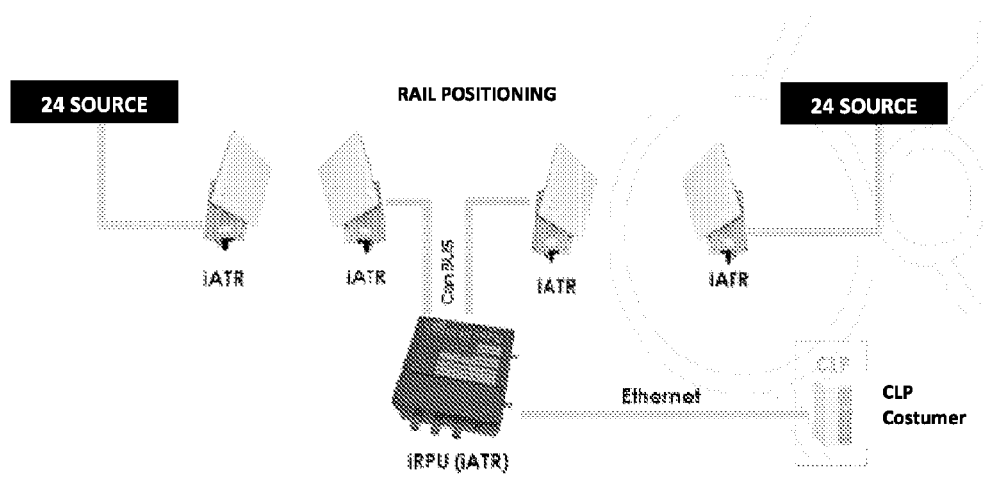
Figure 26:
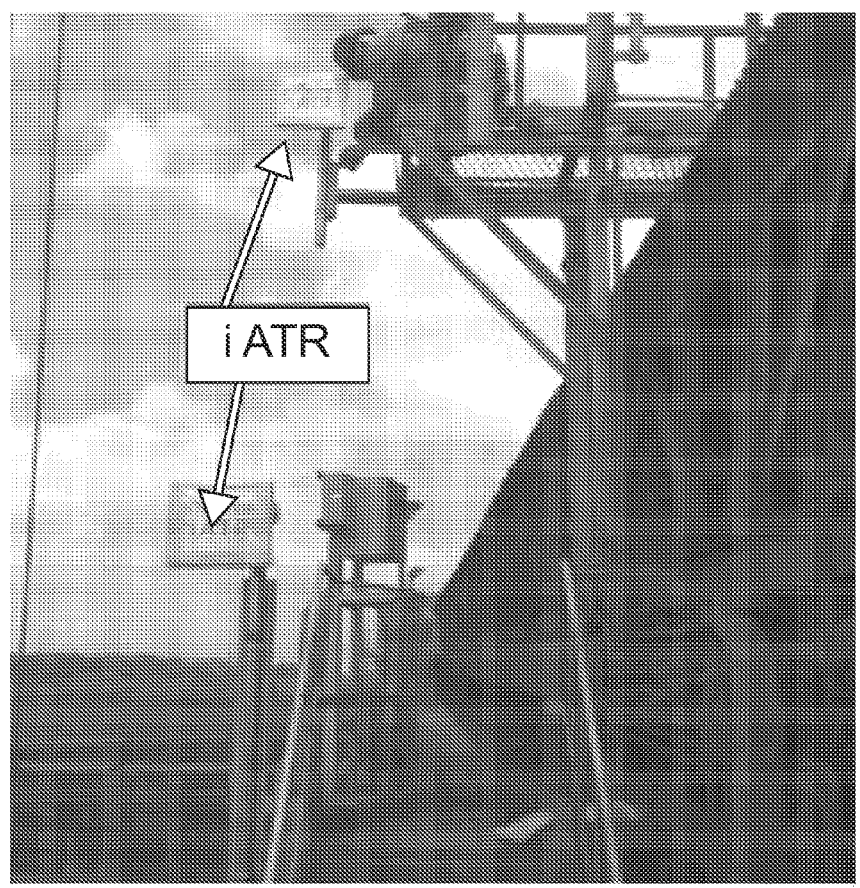
FIG. 26 and FIG. 27 show antennas installed in the TR-313k-18 transfer room and in the ER-313k-03 front portion, respectively. Using the information provided by those antennas, it will be possible to define the ER-313k-03 position along the stockyard.
Figure 27:
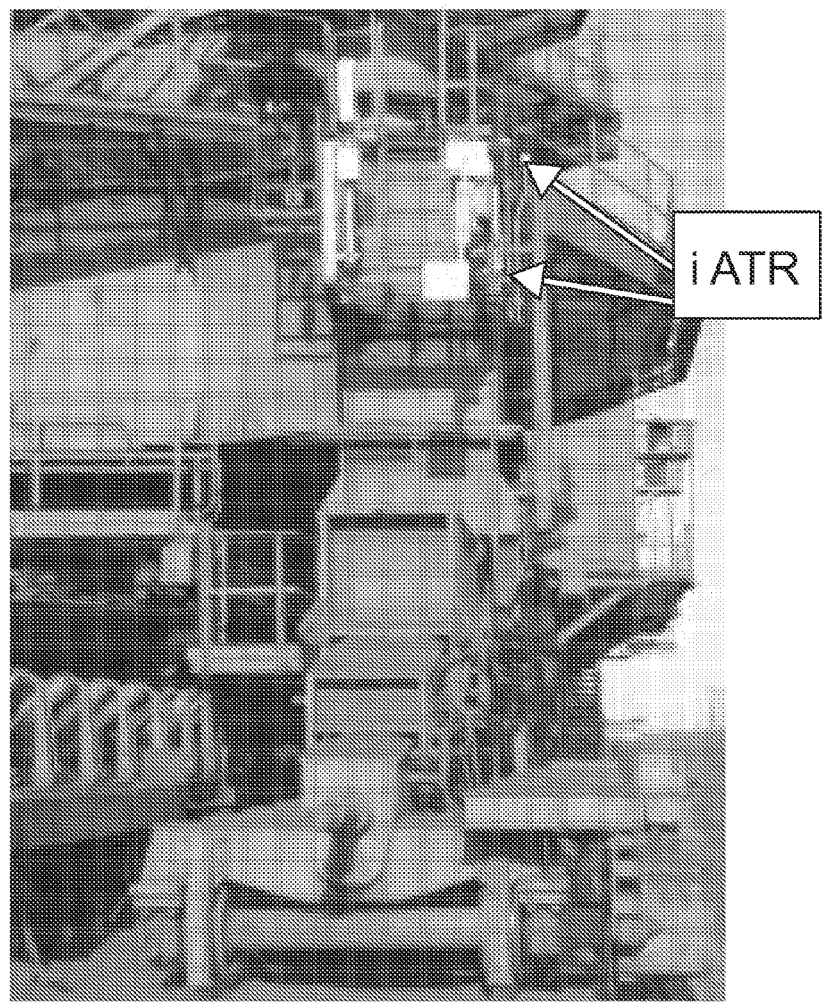
Figure 28:
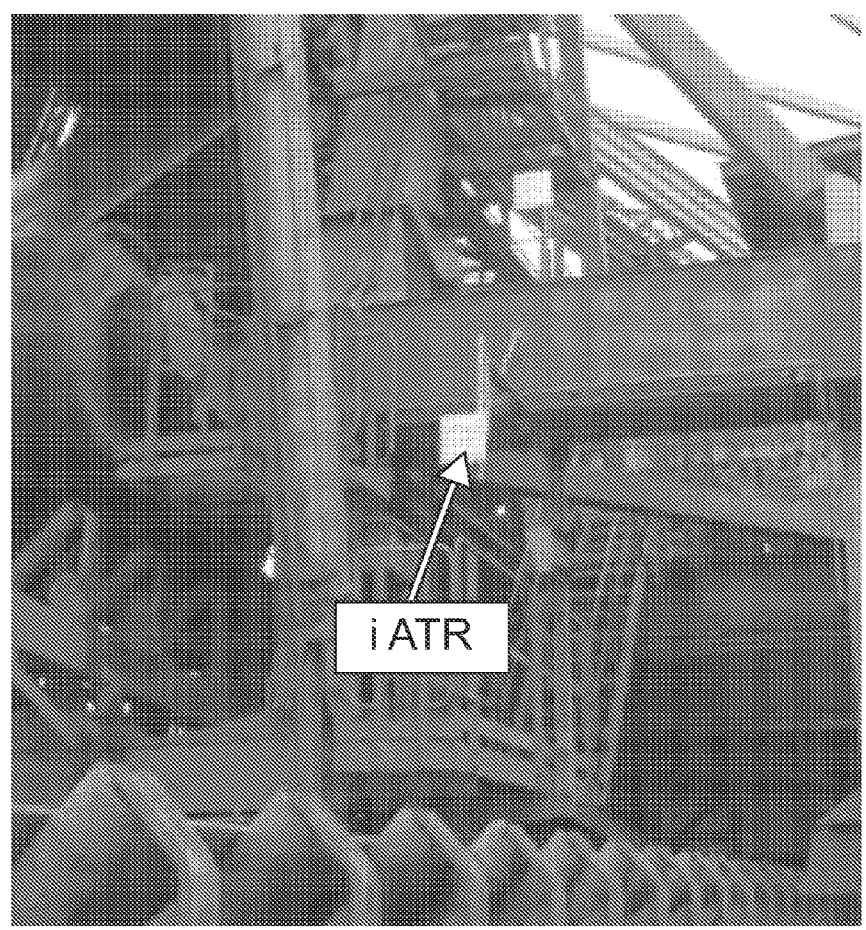
FIG. 28 and FIG. 29 show the antennas installed in the ER-313k-03 rear portion and in the ER-313k-04 front portion, respectively. Using the information provided by those antennas, it will be possible to define the distances between the ER-313k-03 and the ER-313k-04.
Figure 29:
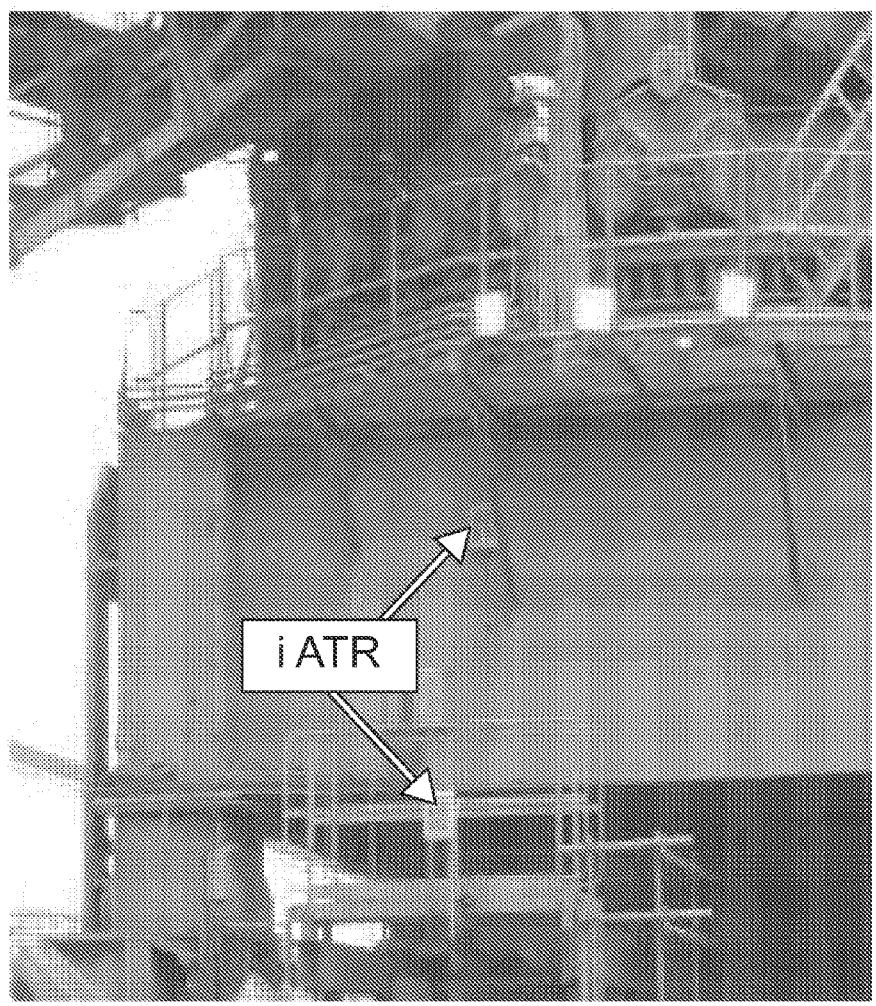
Figure 30:
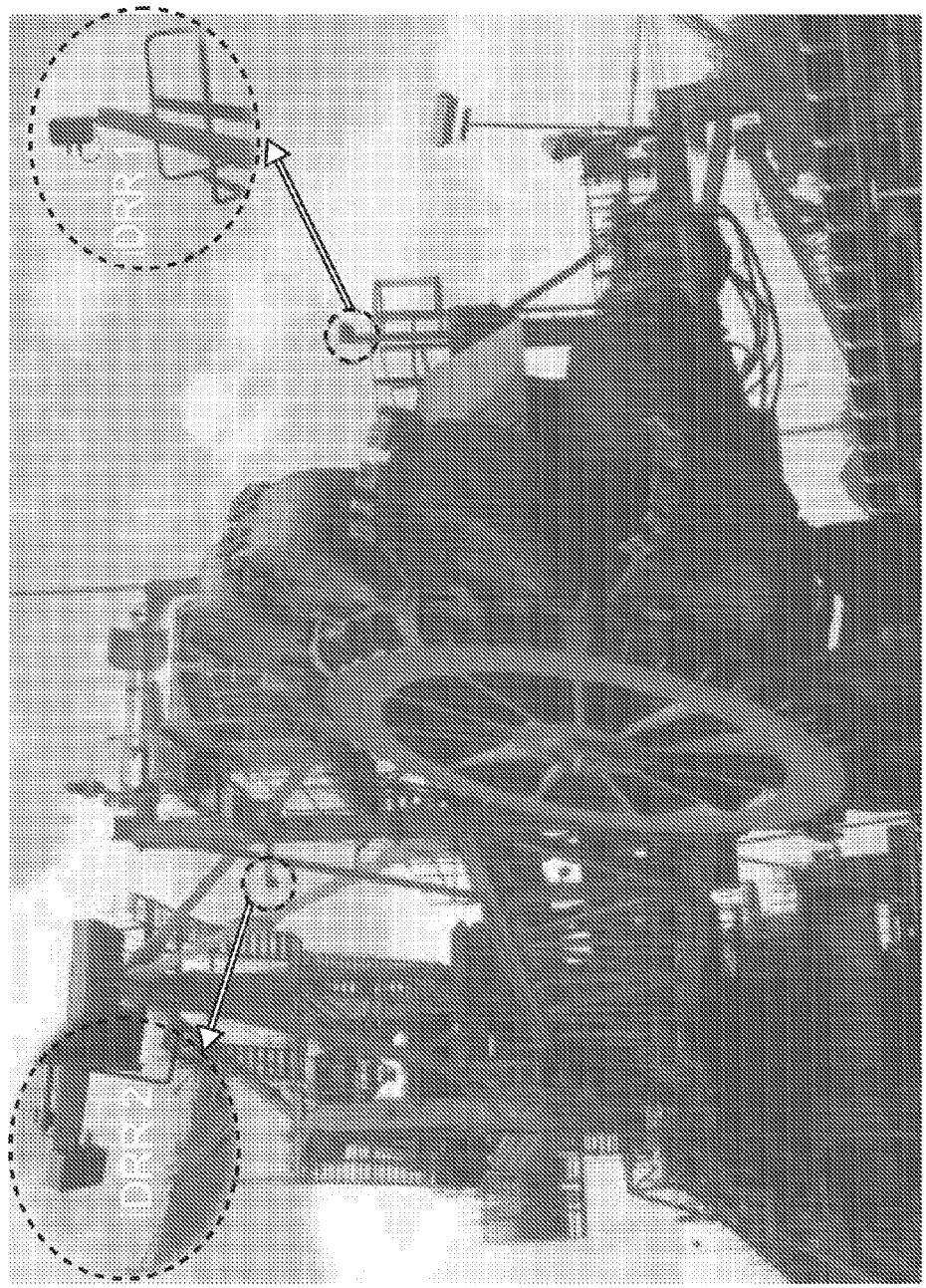

The radar installation angles were defined during the commissioning, where iDRR1 is at 30° and iDRR2 is at 38°, both of them regarding the ground level. The installation place for such radars is shown in FIG. 30.

Installation Features

Pile Profile

IDRR sensors have been configured for reading the distance of the bucket wheel to the pile, using 10 reading zones on each side of the bucket wheel. Each zone is read within a 5-degree angle from the sensor. For zone calibration, iRPU of the iDRR has been configured for storing data obtained by the iDRR, when reclaiming a countertop together with images taken by a device called iCAM. Zone calibration is performed by comparing history data obtained by the iRPU with the images gathered by the iCAM.

Figure 31:
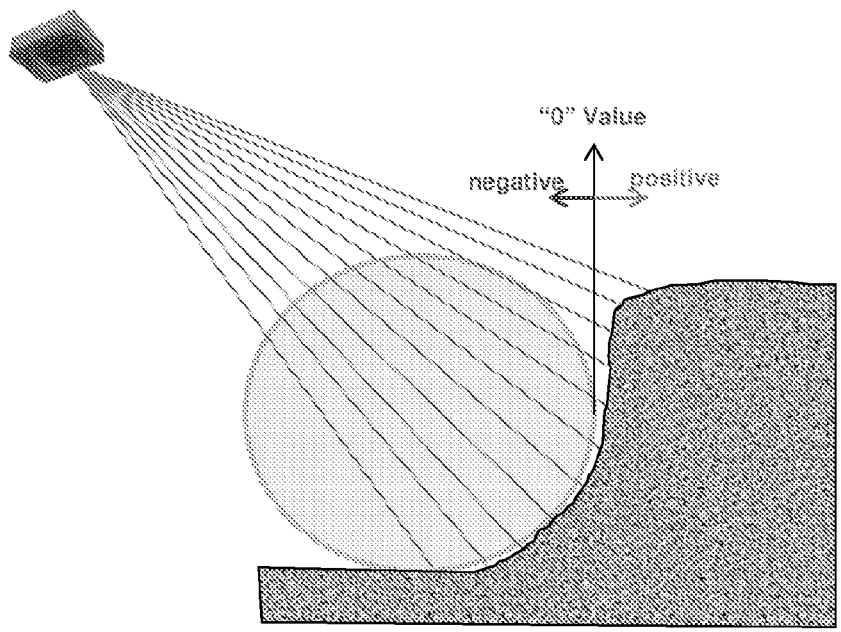

Zone calibration was done in such a way that each zone "0" value follows the bucket wheel geometry. By doing so, if the zones return negative values, it means that ore is being reclaimed by the bucket wheel, and if positive values are shown, it means that the material is away from the bucket wheel attack (FIG. 31).

Bucket Wheel Penetration in the Ore Pile

By means of the solution implemented, it is possible to define how much the bucket wheel is inside the ore pile, that is, the penetration value that will be returned in centimeters. The bigger the bucket wheel penetration in the pile the larger the reclaimed ore quantity and slower the turning speed for maintaining the flow equal to the expected value.

Figure 32:
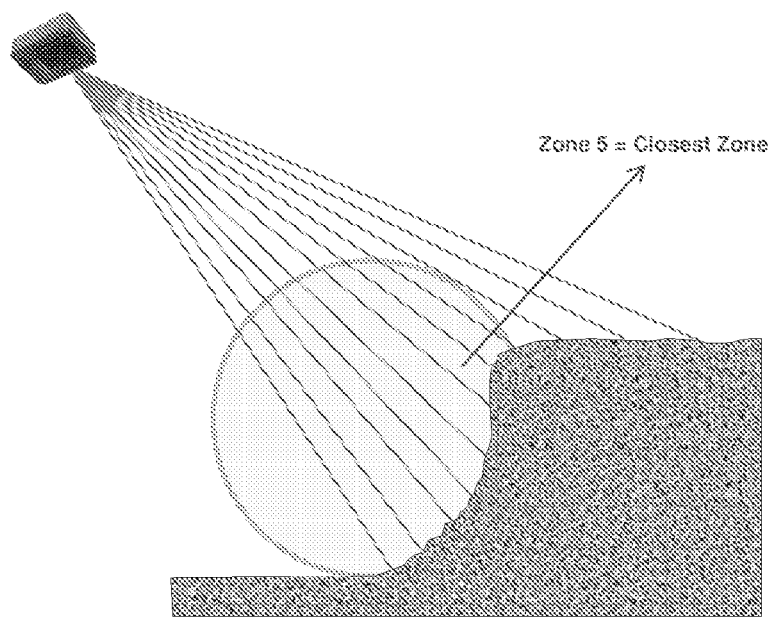

For the definition of penetration value, the system tells the PLC which zone is closer to the sensor. For example, when the machine is reclaiming by turning clockwise, the values read by the iDRR 2 sensor (installed on the bucket wheel right-hand side) will be negative. The iRPU tells the PLC which zone features the most negative value. The value contained in this zone is classified as the bucket wheel penetration distance in the pile. FIG. 32 shows an example of how the iDRR establishes the closest zone.

Countertop Height

Figure 33:
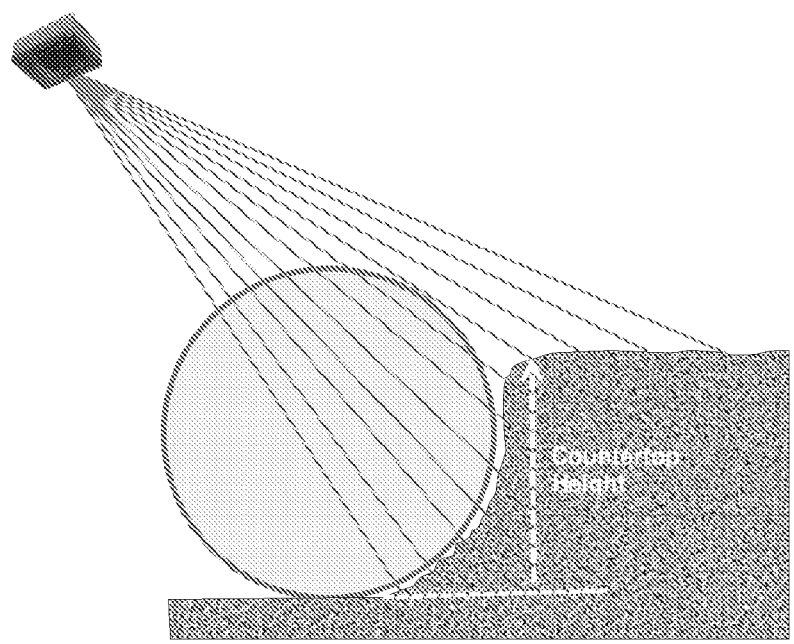

The system measures the height of the countertop that is being reclaimed at that moment. For defining the countertop height, the iDRR identifies the number of zones that feature positive and negative values. By means of such information, it will be possible to establish the countertop height. FIG. 33 shows an example of how the iDRR establishes the countertop height.

Edge Detection

The iDRR sensors will also be used for establishing the countertop edge, therefore it shall monitor the distance to the 10 zones, and based on this information, it will be possible to detect presence of the countertop edge.

Left-Hand Edge Detection

Figure 34:
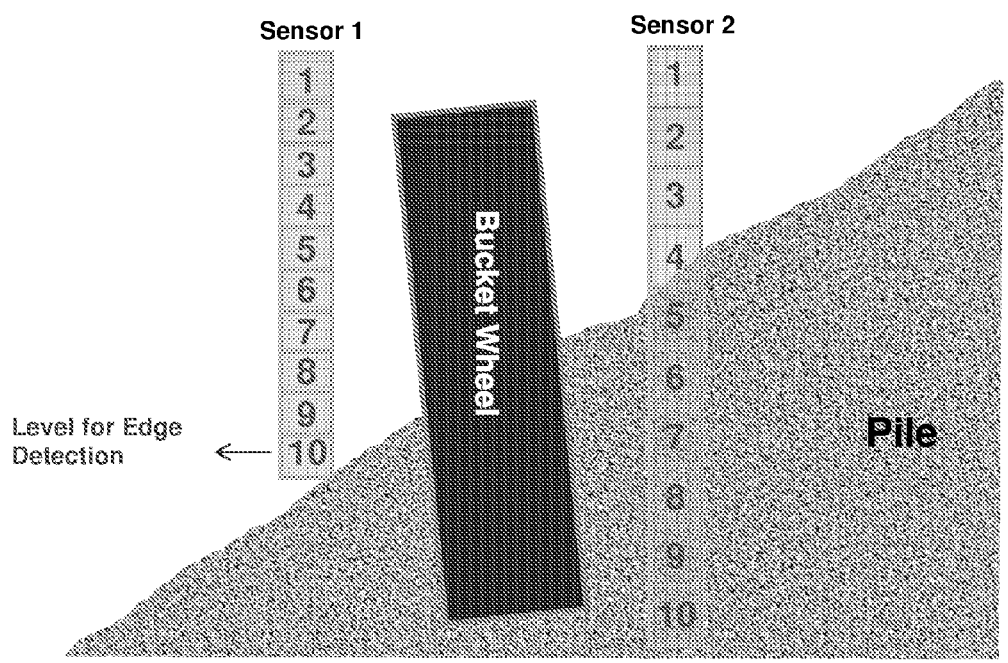
Figure 35:
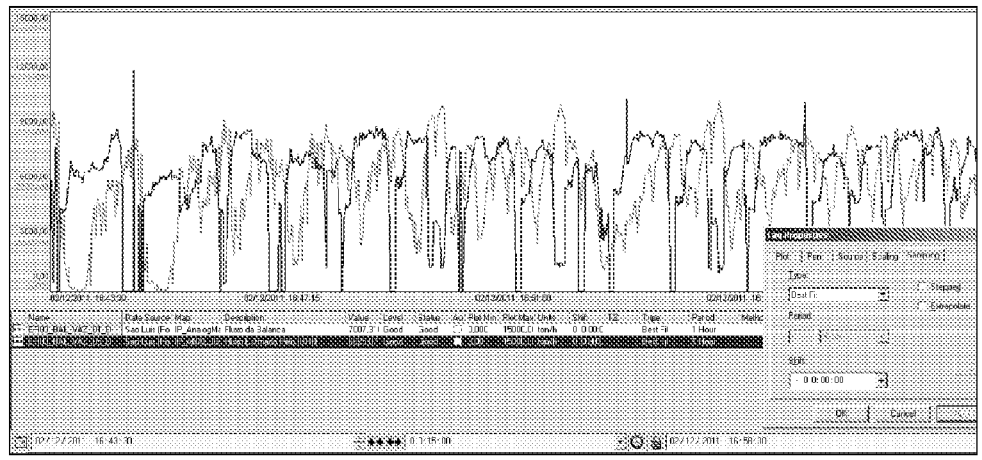
Figure 36:
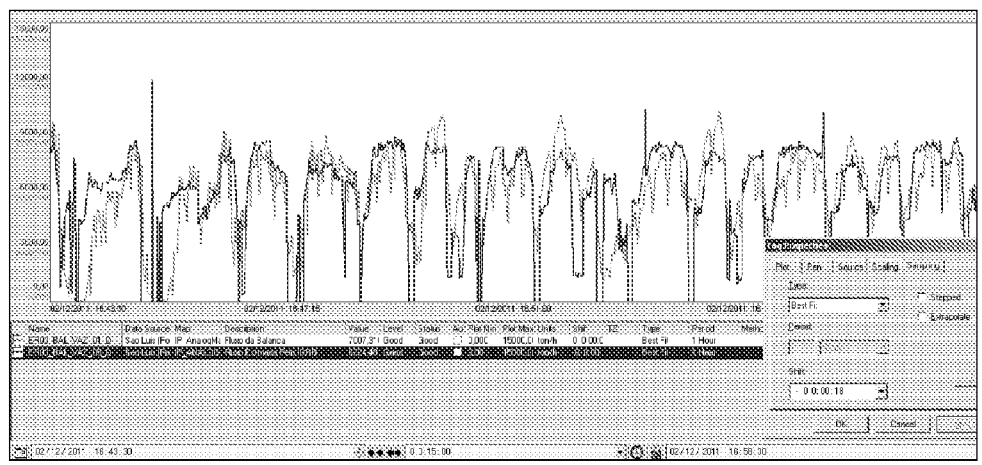

A feature is configured in the reclaimer left-hand sensor (iDRR 1), when it is turning counterclockwise, so that when the zones do not detect the pile any more, a digital signal is sent to the PLC indicating that the pile left-hand edge has been detected. The system will indicate a left-hand edge when all zones do not detect the pile presence as shown on FIG. 34.

Right-Hand Edge Detection

The right-hand pile countertop detection uses the same operation principle as the left-hand edge detection; however, the zone configured for the detected edge indication is the #5 (five). Therefore, the system will indicate right-hand edge when zones from 1 to 5 do not detect the presence of the pile.

Finally, it should be understood that the pictures show the preferred arrangement of the present invention control system, and the actual scope of the invention is defined on the enclosed claims.

The invention claimed is:

1. A control system for bulk material reclaimers comprising:
    an automated control device configured to control a turning speed of a boom that supports a rotatable bucket wheel of a reclaimer when the boom rotates, and to control a translation step of the reclaimer when the reclaimer translates, wherein the turning speed is controlled by a control loop feedback mechanism that uses a process variable to estimate a reclaiming flow, and wherein the device is configured to adjust the translation step as a function of at least one of time or distance.

2. The control system according to claim 1, wherein the process variable is a bucket wheel pressure or electric current.

3. The control system according to claim 1, wherein the control loop feedback mechanism comprises sensors configured to detect one or more of a bench height of a pile, a surface format of the pile, a bucket wheel penetration distance inside the pile, and initial and final turning angles of the boom.

4. The control system according to claim 1, wherein the device is configured to adjust the translation step as a function of time and distance.

5. A control method for bulk material reclaimers comprising:
    estimating a reclaiming flow of a reclaimer based on a bucket wheel pressure or electric current and a reinforcement learning method that uses feedback from a flow control scale;
    adjusting the reclaiming flow via a proportional-integral-derivative ("PID") controller based on a turning speed of a boom that supports a rotatable bucket wheel of the reclaimer; and
    adjusting a translation step of the reclaimer as a function of at least one of distance or time.

6. The method according to claim 5, wherein adjusting the reclaiming flow comprises using sensors to determine at least one parameter selected from a group consisting of a bench height of the pile, a surface format of the pile, a bucket wheel penetration distance inside the pile, initial and final turning angles of the boom, a volume of material to be recovered and an amount of material to be recovered.

7. The method according to claim 5, further comprising sensors installed on both sides of the bucket wheel to sense a parameter selected from a group consisting of a distance of the bucket wheel relative to the pile to determine a penetration distance of the bucket wheel inside the pile, a pile area height to provide control, a volume of material to be recovered and an amount of material to be recovered.

8. The method according to claim 5, wherein adjusting the translation step is a function of time and distance.

9. A system for controlling a reclaiming flow of a reclaimer, comprising:
    a reclaimer comprising:
        a boom arranged to rotate about a vertical axis via a turning motor;
        a bucket wheel arranged on the boom and configured to rotate about a horizontal axis perpendicular to the vertical axis;
        a mechanism arranged to translate the reclaimer relative to a pile of material to be reclaimed; and a plurality of sensors arranged to detect a turning speed of the turning motor, an electric current of the turning motor, a bucket wheel electric current or pressure, a translation step time and a translation step distance;

a control system in communication with the reclaimer, the control system comprising:
  a controller configured to receive an input signal from each of the plurality of sensors, and configured to send an output signal to the turning motor, the bucket wheel and the mechanism,
  wherein the controller is configured to adjust the turning speed of the turning motor, and at least one of the translation step time or the translation step distance of the mechanism to control the reclaiming flow.

10. A method for controlling a reclaiming flow of a reclaimer, comprising:

receiving a signal from a plurality of sensors arranged to respectively detect a turning speed of a turning motor of a boom that is rotatable about a vertical axis, an electric current of the turning motor, a bucket wheel electric current or a pressure of a bucket wheel that is rotatable about a horizontal axis and that is supported by the boom, and a translation step time and a translation step distance of a translation mechanism configured to translate the reclaimer relative to a pile of material to be reclaimed;

determining a reclaiming flow rate of the material reclaimed by the reclaimer based on the received signals;

determining one or more output signals based on a Proportional Integral Derivative (PID) control and sending the one or more output signals to at least one of the turning motor to adjust the turning speed of the turning motor, or the mechanism to adjust at least one of the translation step time or the translation step distance to control the reclaiming flow rate within a predetermined range.

* * * * *